US007922990B2

(12) United States Patent
Hertlein et al.

(10) Patent No.: US 7,922,990 B2
(45) Date of Patent: Apr. 12, 2011

(54) METHOD AND DEVICE FOR PRODUCING GRANULATED POLYCRYSTALLINE SILICON IN A FLUIDIZED BED REACTOR

(75) Inventors: Harald Hertlein, Burghausen (DE); Rainer Hauswirth, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 376 days.

(21) Appl. No.: 12/065,790

(22) PCT Filed: Sep. 4, 2006

(86) PCT No.: PCT/EP2006/065943
§ 371 (c)(1),
(2), (4) Date: Mar. 5, 2008

(87) PCT Pub. No.: WO2007/028776
PCT Pub. Date: Mar. 15, 2007

(65) Prior Publication Data
US 2008/0241046 A1    Oct. 2, 2008

(30) Foreign Application Priority Data
Sep. 8, 2005  (DE) .................. 10 2005 042 753

(51) Int. Cl.
*C01B 33/02*    (2006.01)
(52) U.S. Cl. ................... 423/349; 427/8; 422/146
(58) Field of Classification Search .......... 423/249, 423/146, 349; 427/8, 213
See application file for complete search history.

(56) References Cited

U.S. PATENT DOCUMENTS

| | | | |
|---|---|---|---|
| 4,684,513 A * | 8/1987 | Iya ................... | 423/349 |
| 4,784,840 A * | 11/1988 | Gautreaux et al. ...... | 423/349 |
| 4,851,297 A * | 7/1989 | Allen et al. ............ | 428/570 |
| 4,868,013 A | 9/1989 | Allen | |
| 5,077,028 A * | 12/1991 | Age .................. | 423/350 |
| 5,104,633 A * | 4/1992 | Sakaguchi et al. ...... | 423/350 |
| 5,165,908 A | 11/1992 | Van Slooten et al. | |
| 5,374,413 A | 12/1994 | Kim et al. | |
| 5,382,412 A | 1/1995 | Kim et al. | |
| 6,007,869 A * | 12/1999 | Schreieder et al. ...... | 427/213 |
| 6,827,786 B2 * | 12/2004 | Lord .................. | 118/716 |
| 7,029,632 B1 | 4/2006 | Weidhaus et al. | |
| 2002/0081250 A1 | 6/2002 | Lord | |
| 2002/0102850 A1 | 8/2002 | Kim et al. | |

FOREIGN PATENT DOCUMENTS

| | | |
|---|---|---|
| DE | 3910343 A1 | 10/1989 |
| DE | 4327308 C2 | 2/1995 |
| DE | 19948395 A1 | 5/2001 |
| EP | 1223145 A1 | 7/2002 |
| EP | 0832312 B1 | 1/2003 |
| JP | 6127914 A | 5/1994 |
| JP | 06-127914 | * 10/1994 |

OTHER PUBLICATIONS

Patent Abstract Corresponding to DE 19948395 A1. Patent Abstract Corresponding to DE 4327308 C2.
Patent Abstract Corresponding to DE 3910343 A1.
Patent Abstract Corresponding to JP 6127914.

* cited by examiner

*Primary Examiner* — Stuart Hendrickson
*Assistant Examiner* — Richard M Rump
(74) *Attorney, Agent, or Firm* — Brooks Kushman P.C.

(57) ABSTRACT

A fluidized bed process for the production of polycrystalline silicon granules supplies, in addition to reaction gas, a gas containing 99.5 to 95 mol. percent hydrogen and 0.5 to 5 mol. percent gaseous silicon compounds, and the reactor wall is maintained at the same or a higher temperature than the reaction zone, such that the deposition of silicon on reactor internals is minimized.

16 Claims, 7 Drawing Sheets

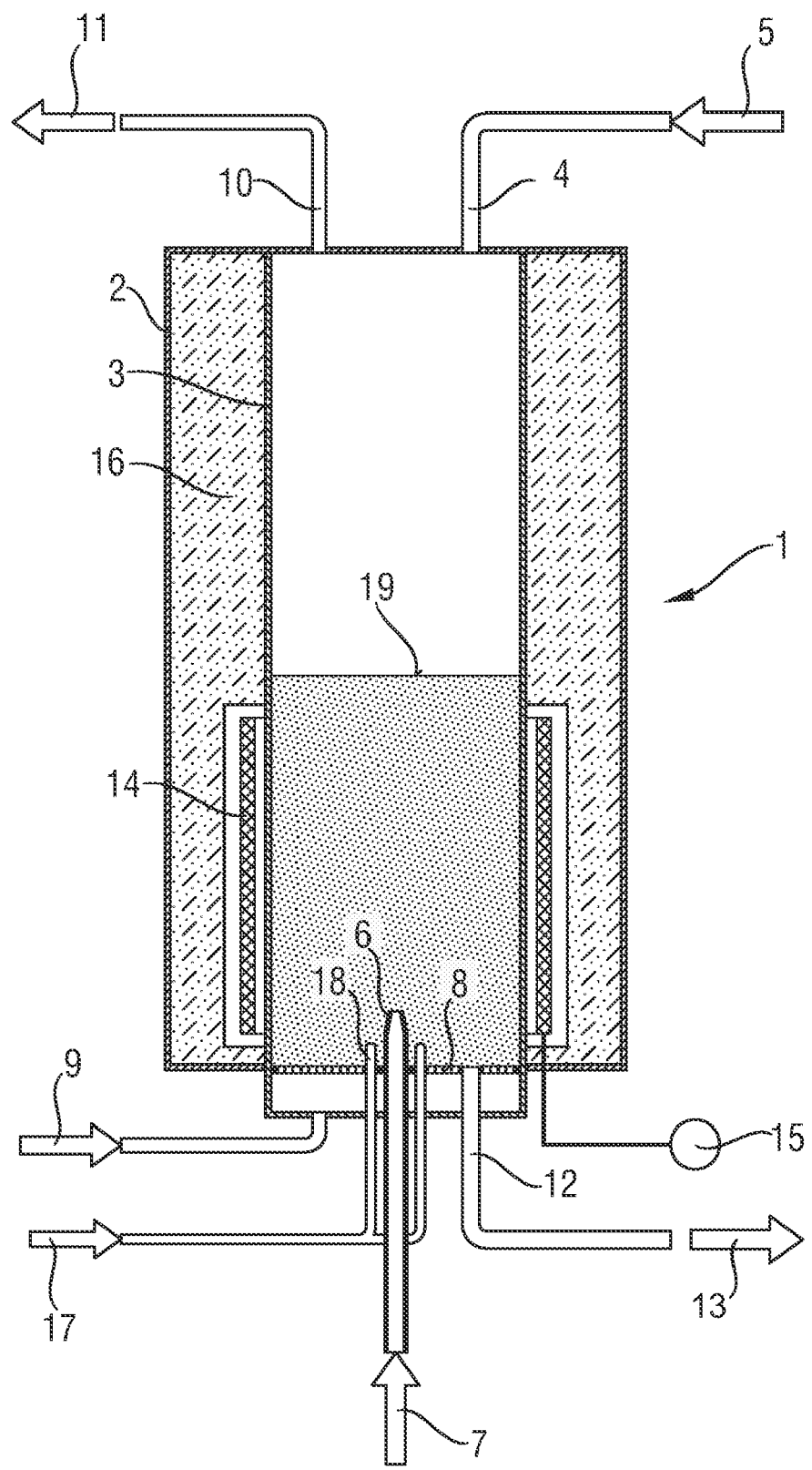

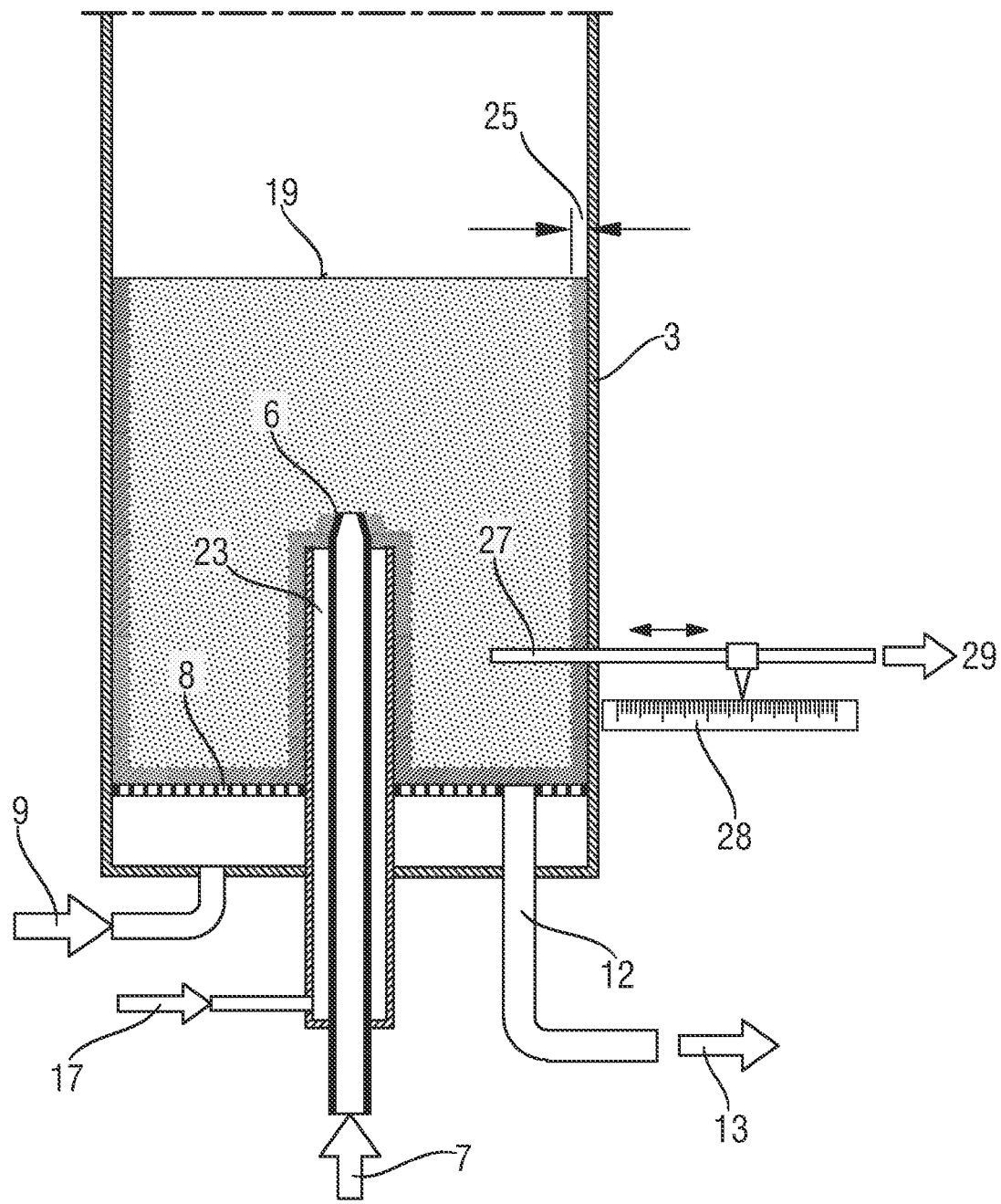

US 7,922,990 B2

Figure 2A:
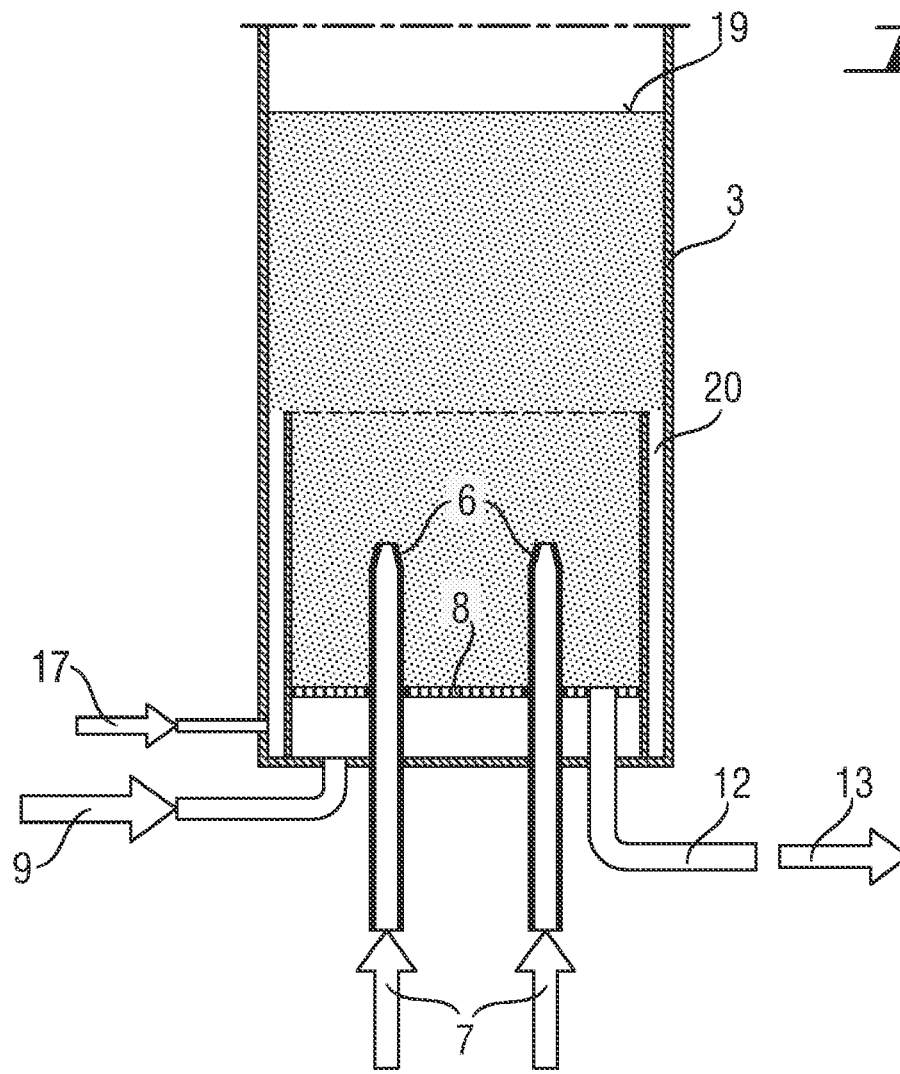

METHOD AND DEVICE FOR PRODUCING GRANULATED POLYCRYSTALLINE SILICON IN A FLUIDIZED BED REACTOR

CROSS-REFERENCE TO RELATED APPLICATION

This application is the U.S. national phase of PCT Appln. No. PCT/EP2006/065943 filed Sep. 4, 2006 which claims priority to German application DE 10 2005 042 753.7 filed Sep. 8, 2005.

BACKGROUND OF THE INVENTION

1. Field of the Invention

The invention relates to a method and a device for producing granulated polycrystalline silicon in a fluidized bed reactor.

2. Description of the Related Art

Highly pure polycrystalline silicon is used inter alia for the production of electronic components and solar cells. It is obtained by thermal decomposition of a gas containing silicon or a gas mixture containing silicon.

This process is referred to as chemical vapor deposition (CVD). On an industrial scale, this process is carried out in so-called Siemens reactors.

SUMMARY OF THE INVENTION

Most recently, there have been many efforts to use a continuous fluidized bed method as an alternative to the Siemens batch method. These employ a fluidized bed of silicon particles, in general approximately spherical particles with a diameter of from 200 to 3000 μm. The particles are heated to a deposition temperature of preferably 600-1100° C. and a gas or gas mixture containing silicon, for example trichlorosilane or a trichlorosilane/hydrogen mixture, is fed through the fluidized bed. Elementary silicon is thereby deposited on all the hot surfaces, and the silicon particles grow in size. Such a method and a suitable reactor are described, for example, in DE 19948395 A1. By the regular extraction of growing particles and addition of small particles as seed particles, the method can in theory be operated continuously with all the advantages associated therewith. In practice, however, deposition of silicon on the hot reactor parts, for example the reactor wall, installed components and nozzles leads to thermo-mechanical loading of the reactor and therefore to reactor outages owing to heat stagnation on the reactor surfaces. Minimizing the problem of silicon deposition on the hot reactor surfaces is of crucial importance for economically viable operation of the fluidized bed method.

Application US 2002/0102850 A1 (Kim) describes a method and an apparatus for avoiding or removing silicon deposition on educt gas nozzles by continuous, discontinuous or regulated injection of HCl+inert gas ($H_2$, $N_2$, He, Ar) or inert gas $H_2$. The operating costs disadvantageously increase with such process management, since the conversion ratio and therefore the reactor space-time yield is reduced by HCl dosing. The use of electronics grade HCl furthermore requires additional process steps for purification and to maintain purity, and therefore entails an increased contamination risk and higher starting material costs.

Patent DE 4327308 C2 (corresponding to U.S. Pat. No. 5,382,412) describes a reactor in which heating and reaction zones are separated and the reactor is heated using microwaves. The microwave heating is intended to avoid wall overheating and therefore wall deposition, since an elevated wall temperature entails increased Si wall deposition. This patent also discloses that deposition takes place on walls at temperatures in excess of 400° C. and cooling the wall is uneconomical owing to the energy loss.

U.S. Pat. No. 4,868,013 (Allen) describes a method in which the reactor surface is cooled by injecting cold inert gas (for example $H_2$) and the wall deposition is thereby reduced.

EP 0 832 312 B1 or US 2002/0081250 A1 describes a method in which the wall deposit is etched away or partially etched with an operating temperature at or close to the operating temperature of the fluidized bed reactor using a halogenated gaseous etchant such as hydrogen chloride, chlorine gas or silicon tetrachloride. All said etchants lead to a local reversal of the actual target reaction, thus reduce the space-time yield of the reactor and therefore reduce the economic viability of the method.

DE 3910343 A1 (Union Carbide Corp) describes a reactor which prevents wall deposition by a reactor double wall. Only fluidizing gas, but no reaction gas, is injected into the outer ring of the reactor wall. This application describes the problem that the reactor wall is at a higher temperature than the fluidized bed, which leads to deposition of silicon on the wall and consequently inferior heat transport into the reactor. The double wall achieves separation of the heating and reaction zones, the heat transport into the heating zone being sustained well.

The disadvantage of all said solutions for avoiding the deposition silicon on the reactor surface consists in the increased operating costs. HCl/inert gas dosing decreases the conversion ratio and therefore the reactor space-time yield, since the HCl/inert gas dosing counteracts the actual goal of the silicon deposition. Furthermore, hydrogen chloride is not generally available in high purity, like the other educt gases (hydrogen, chlorosilanes). In order to use hydrogen chloride, an additional system would thus be necessary in order to bring it to the appropriate quality. In the case of wall cooling, the energy demand of the method increases so significantly that the method becomes uneconomical.

It was an object of the invention to provide an economically viable method for the production of granulated polycrystalline silicon in a fluidized bed reactor with a heated surface, in which the deposition of silicon on the surface of the fluidized bed reactor is reduced.

The object is achieved by a method in which a reaction gas containing a gaseous silicon compound is deposited in a reactor with a hot surface at a reaction temperature of from 600 to 1100° C. as silicon metal on silicon particles, which are fluidized by means of a fluidizing gas to form a fluidized bed, and the particles provided with the deposited silicon are removed from the reactor together with unreacted reaction gas and fluidizing gas, wherein a gas composition containing from 99.5 to 95 mol. % of hydrogen and from 0.5 to 5 mol. % of the gaseous silicon compound is present on the surface of the reactor and the surface of the reactor is at a temperature of from 700 to 1400° C. and this temperature corresponds to the temperature of the silicon particles or is higher than the temperature of the silicon particles.

DETAILED DESCRIPTION OF THE PREFERRED EMBODIMENT

It has very surprisingly been found that by combining a high reactor surface temperature with a gas composition containing from 99.5 to 95 mol. % of hydrogen and from 0.5 to 5 mol. % of the gaseous silicon compound on the reactor surface, it is possible to set up a reaction equilibrium in which deposition of silicon on the surface of the reactor virtually no longer takes place, and continuous process control is therefore possible and even preferable.

The method according to the invention has a lower energy consumption than the methods described in the prior art with cooling of the reactor wall or reaction gas nozzle. It furthermore has an increased space-time yield compared with the methods of the prior art with dosing of hydrogen halides. It is also therefore economically advantageous.

A gas composition containing from 97 to 99 mol. % of hydrogen and from 1 to 3 mol. % of the gaseous silicon compound is preferably present on the surface of the reactor.

The gas composition on the surface of the reactor may comprise further compounds, for example constituents from the waste gas of the reactor, for example the cycle gas. Cycle gas is the waste gas of the reactor, from which all components with a boiling point above 60° C. have been removed, preferably by condensation.

The temperature on the surface of the reactor is preferably from 800 to 1100° C.

The fluidizing gas is preferably hydrogen, cycle gas or a mixture of these gases.

The reaction gas, which contains a gaseous silicon compound, is preferably a monosilane or a chlorosilane compound, or a monosilane-hydrogen or chlorosilane-hydrogen mixture. It is most preferably trichlorosilane or a trichlorosilane-hydrogen mixture.

The local concentration ratios on the reactor surface are adjusted via appropriate dosing of the quantity ratios of fluidizing gas and reaction gas by injecting gas mixtures with a different composition of fluidizing gas and reaction gas. The local gas composition can respectively be adjusted differently at various positions in the reactor. According to the invention, the gas composition in the reactor is controlled by gas quantity regulation so that a gas composition containing from 99.5 to 95 mol. % of hydrogen and from 0.5 to 5 mol. % of the gaseous silicon compound is present on the surface of the reactor. In the rest of the reaction space, there is a gas mixture with a high proportion of a gaseous silicon compound, preferably from 20 to 80 mol. %, most preferably from 30 to 50 mol. %, in hydrogen.

As a total of all the gas quantities, the gas composition in the reactor cross section preferably contains from 15 to 60 mol. % of gaseous silicon compound and from 40 to 85 mol. % of hydrogen, preferably from 20 to 50. % of gaseous silicon compound and from 50 to 80 mol. % of hydrogen.

The method according to the invention is preferably carried out in the range of from 1 to 20 bar absolute, most preferably in the range of from 1 to 6 bar absolute.

The invention also relates to a device for carrying out the method according to the invention.

This device is a fluidized bed reactor (1), which comprises:
a) a pressure-resistant casing (2),
b) an inner reactor tube (3) made of a material which has a high transmission for thermal radiation,
c) an inlet (4) for silicon particles (5),
d) an inlet device (6) for supplying a reaction gas (7) which contains a gaseous or vapor-form silicon compound,
e) a gas distributor (8) for supplying a fluidizing gas (9),
f) an outlet (10) for unreacted reaction gas, fluidizing gas as well as the gaseous or vapor-form products of the reaction (11), which accumulate above the fluidized bed surface (19),
g) an outlet (12) for the product (13)
h) a heating device (14),
i) a power supply (15) for the heating device (14)
wherein additional nozzles (18) are provided in the region of the reactor surfaces to be protected, via which a gas composition (17) containing from 99.5 to 95 mol. % of hydrogen and from 0.5 to 5 mol. % of the gaseous silicon compound is introduced into the reactor.

Insulation (16) is preferably arranged around the inner reactor tube (3) in order to reduce energy losses.

The heating device (14) is preferably a radiation source for thermal radiation, which is arranged annularly outside the inner reactor tube (3) and without direct contact with it.

High transmission for thermal radiation is preferably intended to mean that the reactor tube has a transmission of preferably more than 80% for the thermal radiation emitted by the heater.

In one embodiment of the invention, the inlet device (6) is designed annularly and the fluidized bed is divided into a heating zone and a reaction zone, lying above the latter. In this embodiment, the heating device (14) is preferably designed so that it heats the silicon particles in the heating zone by means of thermal radiation to a temperature such that the reaction temperature is set up in the reaction zone.

In the context of the present invention, "reactor surface" and "surface of the reactor" are preferably intended to mean the reactor wall's surface facing the reaction space (that surface of the inner reactor tube (3) in the fluidized bed reactor (1) which faces the reaction space), the inlet device's surface facing the reaction space and, if applicable, that surface of the components installed in the reactor which faces the reaction space. The installed components are components which are conventional for fluidized bed reactors, such as flow baffling or gas bubble disintegrating components, for example perforated bottoms or zigzag bodies.

The reactor surface is preferably heated in addition to the conventional fluidized bed heating. This may, for example, be done using electrical heating coils in the surface of the inlet device or by enhanced radiative heating of the reactor wall.

The local concentration adjustment of the gas composition in the reactor may be facilitated by further nozzles, lances or components, as represented by way of example in the figures.

FIG. 1 schematically shows a longitudinal section of an embodiment of a reactor according to the invention, in which the gas mixture with a high proportion of a gaseous silicon compound in hydrogen (7) is introduced into the reactor through a central inlet device (6) in the form of a nozzle, and a gas mixture having a proportion of from 99.5 to 95 mol. % of hydrogen and from 0.5 to 5 mol. % of the gaseous silicon compound (17) is introduced into the reactor (1) through nozzles (18) placed around the latter.

Figure 2B:
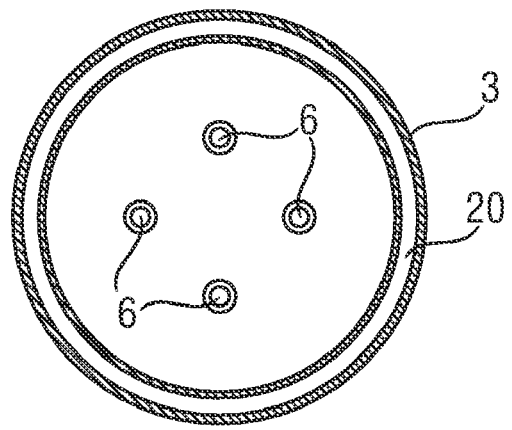

FIGS. 2a and 2b schematically show a longitudinal and cross section of an embodiment of a reactor according to the invention, which has a central inlet device in the form of a plurality of central nozzles (6) for supplying the reaction gas, which contains a gaseous or vapor-form silicon compound in hydrogen, and an annular gap (20) through which the gas composition containing from 99.5 to 95 mol. % of hydrogen and from 0.5 to 5 mol. % of the gaseous silicon compound is introduced into the inner reactor tube (3).

Figure 3A:
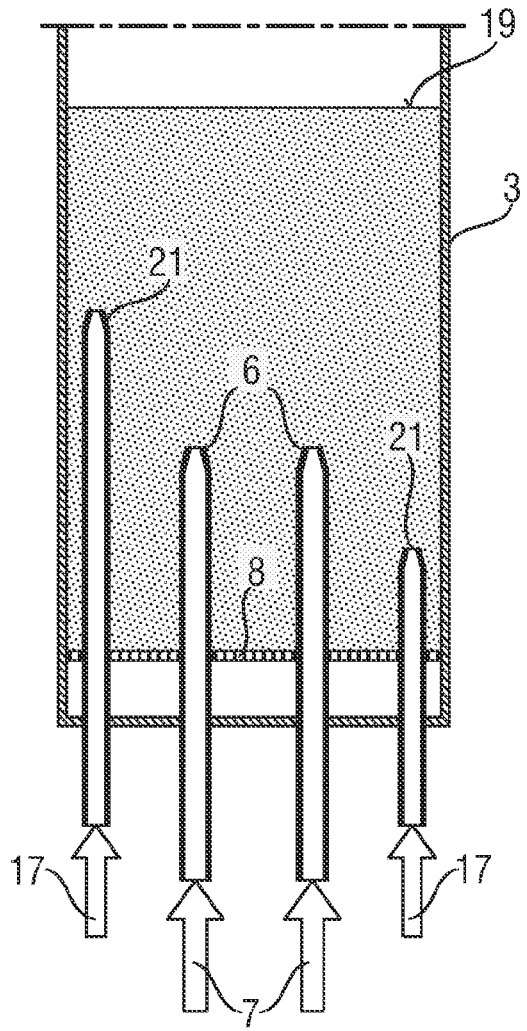
Figure 3B:
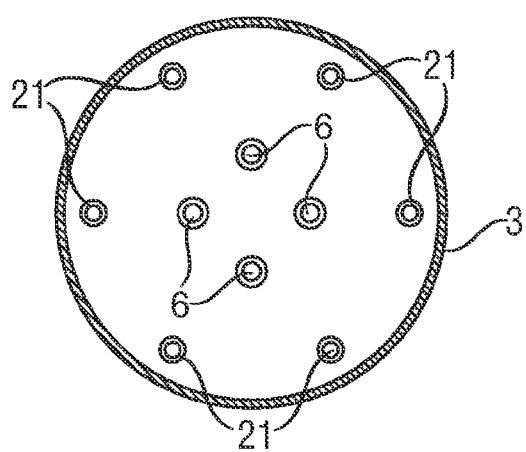

FIGS. 3a and 3b schematically show a longitudinal and cross section of an embodiment of a reactor according to the invention, which has a plurality of central nozzles (6) as a central inlet device for supplying the reaction gas, which contains a gaseous or vapor-form silicon compound in hydrogen, and a plurality of short or long bottom nozzles (21) through which the gas composition containing from 99.5 to 95 mol. % of hydrogen and from 0.5 to 5 mol. % of the gaseous silicon compound is introduced into the inner reactor tube (3).

Figure 4A:
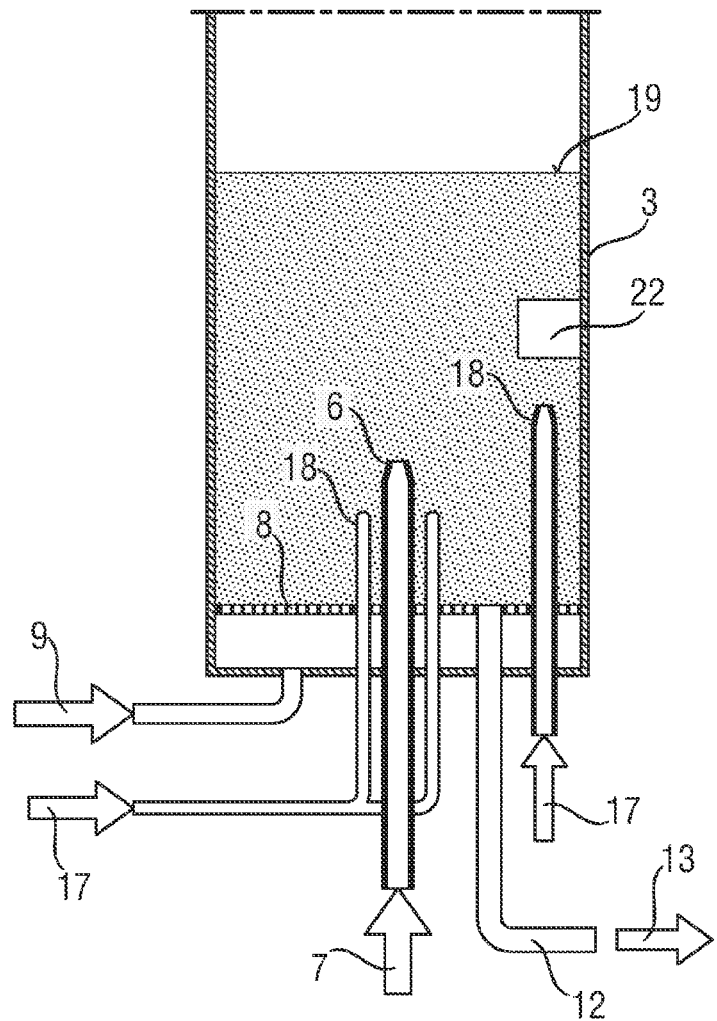
Figure 4B:
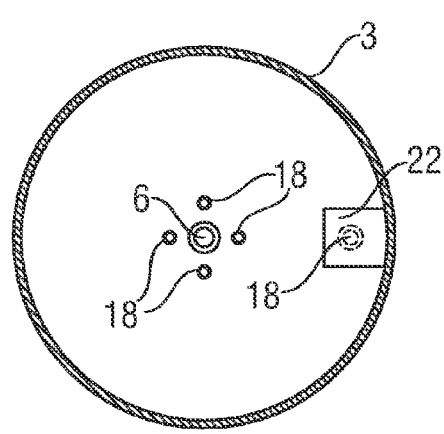

FIGS. 4a and 4b schematically show a longitudinal and cross section of an embodiment of a reactor according to the invention, in which, in order to protect against silicon deposition on installed components (22) and the central nozzle (6) through which the gas mixture with a high proportion of a gaseous silicon compound is introduced into the inner reactor tube (3), additional nozzles (18), through which the gas composition containing from 99.5 to 95 mol. % of hydrogen and from 0.5 to 5 mol. % of the gaseous silicon compound is introduced into the inner reactor tube (3), are provided in the vicinity of the installed components (22) and the central nozzle (6).

Figure 5A:
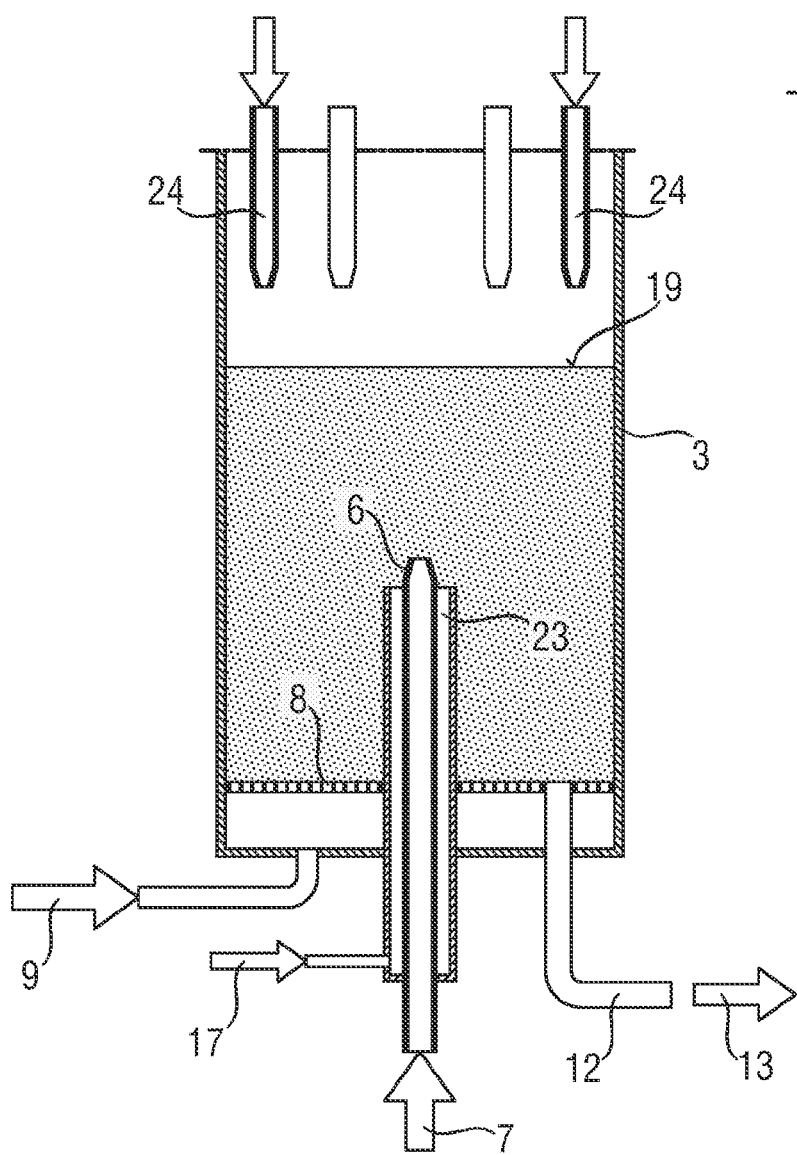
Figure 5B:
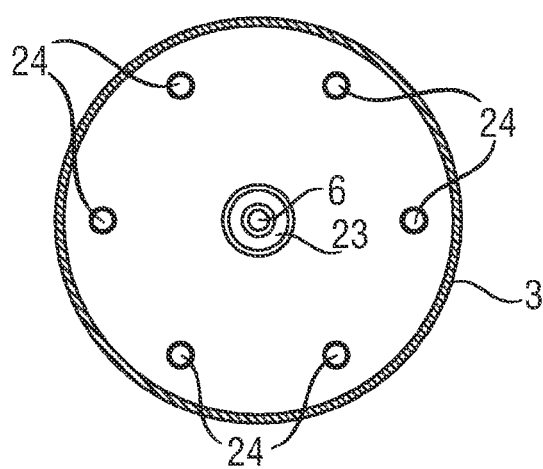

FIGS. 5a and 5b schematically show a longitudinal and cross section of an embodiment of a reactor according to the invention, in which an annular gap nozzle (23) is provided for protecting the surface of the central nozzle (6) and reactor head nozzles (24) are provided for protecting the surface of the inner reactor tube (3), the gas composition containing from 99.5 to 95 mol. % of hydrogen and from 0.5 to 5 mol. % of the gaseous silicon compound being introduced into the inner reactor tube (3) through the annular gap nozzle (23) and the reactor head nozzles (24).

FIG. 6 schematically shows the measurement of the reduction in the reaction gas concentration in a reactor according to the invention. To this end a sample suction tube (27) with a diameter of 6 mm, which was provided with a graduated scale (28) outside the reactor, was inserted radially through the inner reactor tube (3) to different depths in the reactor. It is therefore possible to measure the radial concentration profile at a particular reactor height. In order to obtain information about the axial concentration profile in the reactor, a plurality of holes were made for introducing the sample suction tube at different reactor heights, and the same measurements were carried out (not shown). The analytical conduct of the gas concentration measurement took place in a gas chromatograph (29) with a capillary column (OV1 column). The individual gas components were separated by multiplicative distribution between a gaseous "mobile" phase and a liquid "stationary" phase. The separated components were detected in the eluate using a thermal conductivity detector. The reaction gas concentration decreased to from 20 to 80 mol. % in the immediate vicinity of all inner reactor tube surfaces and all components such as nozzles etc. installed inside the reactor. The concentration reduction took place with an s-shaped profile inside the first six particle layers, i.e. with an average particle diameter of 0.75 mm in a boundary layer of 4.5 mm. The concentration of from 0.5 to 5% was measured as a limit value at a wall distance of 0 mm (25). Further measurements were taken at distances of 1, 2, 3, 4, 5 mm etc. For measurements at a distance of greater than or equal to 5 mm (25), the position lies in the reaction space (26) with a reaction gas concentration of from 20 to 80 mol. %.

Figure 7:
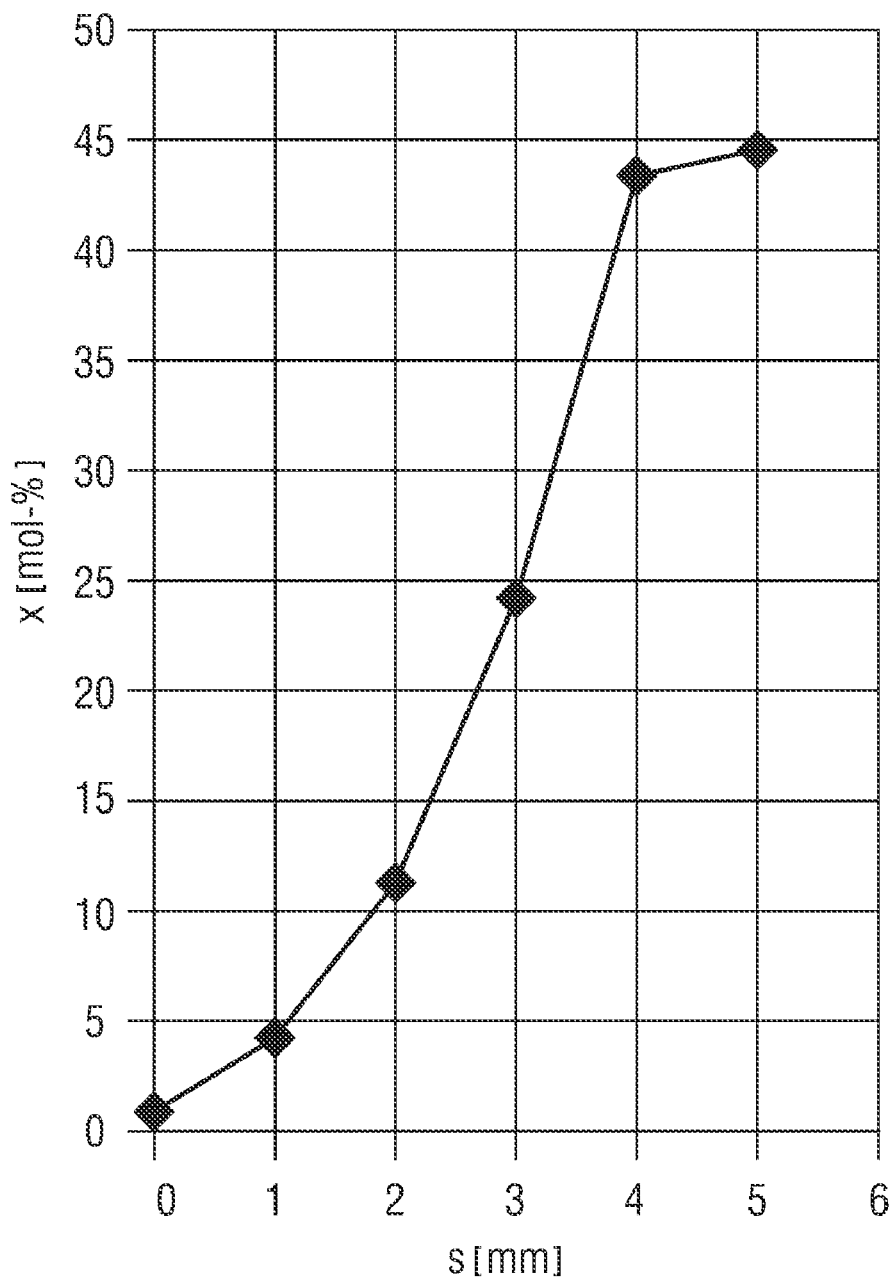

FIG. 7 shows the s-shaped profile of the concentration reduction inside the first six particle layers as described in FIG. 6.

The following examples serve to describe the invention further:

EXAMPLE 1

A pressure-proof steel vessel with an inner diameter of 770 mm contains the inner reactor tube, namely a quartz tube with an inner diameter of 600 mm and a length of 2200 mm. At the lower end of the quartz tube, a plate of quartz provided with openings forms the gas distributor for the fluidizing gas. Arranged in a central circle with a diameter of 250 mm, further quartz tubes with an inner diameter of 20 mm and a length of 250 mm project from the gas distributor plate into the inner reactor tube 4 as an inlet device for supplying the gas or gas mixture containing silicon. The quartz plate is furthermore provided with two openings to remove product.

A radiation heater is provided for introducing energy into the reactor by means of thermal radiation. It comprises plates of graphite annularly connected to one another, which surround the inner reactor tube without touching it. The radiation heater was supplied with electrical power via an adjustable voltage source. Its maximum power was 200 kW.

The reactor was initially filled with 225 kg of silicon granules having an average particle diameter of 600 μm.

The following conditions were set up in the reactor:

| | |
|---|---|
| Fluidizing gas (hydrogen): | 290 m$^3$/h (standard conditions) |
| Preliminary temperature of fluidizing gas | 400° C. |
| Reaction gas trichlorosilane | 270 kg/h |
| Operating temperature: | 900° C. |
| Pressure in the reactor: | 200 kPa (absolute) |
| Reactor wall temperature | 910° C. |
| Nozzle wall temperature | 910° C. |
| Heating power: | 190 kW |

A reaction gas concentration of 0.1 mol. % trichlorosilane in hydrogen was measured on the inside of the reactor tube and on the outside of the reaction gas nozzles with the aid of a gas chromatograph measurement at said parameter settings. The fluidized bed was operated for 700 hours with a fluidization velocity $u_{mf}$ of approximately 1.5 fold. The particle size analysis of the particles extracted thereafter revealed an average particle diameter of 665 μm. The inside of the reactor tube and the outside of the reaction gas nozzles had local silicon deposits after 700 hours. The greatest thickness of the deposit on the wall was 0.8 mm. The greatest thickness of the deposit on the nozzles was 0.9 mm.

EXAMPLES 2 TO 9

Similarly as in Example 1, with conditions otherwise remaining the same, the parameters operating temperature, nozzle wall temperature, reactor wall temperature and the reaction gas concentrations on the wall and on the nozzle were varied, and the maximum deposition/h on the wall and on the inlet device were determined. Tab. 1 lists the varied conditions and the maximum deposition of silicon on the wall. Tab. 2 lists the varied conditions and the maximum deposition of silicon on the inlet device.

TABLE 1 variation of the operating parameters and silicon deposition on the reactor wall with a reactor pressure of 2 bar absolute

| Example | Operating temperature (° C.) | Reactor wall temperature (° C.) | Reaction gas concentration locally on the wall (mol. %) | Wall deposition (μm/h) |
|---|---|---|---|---|
| 1 (C) | 900 | 910 | 0.1 | 0.8 |
| 2 | 900 | 910 | 5 | 0.02 |
| 3 (C) | 900 | 800 | 0.1 | 2.0 |
| 4 (C) | 900 | 800 | 5 | 1.1 |
| 5 (C) | 1000 | 1010 | 0.1 | 1.0 |
| 6 | 1000 | 1010 | 5 | 0.01 |
| 7 (C) | 1000 | 900 | 0.1 | 2.5 |
| 8 (C) | 1000 | 900 | 5 | 1.2 |
| 9 | 950 | 950 | 2 | 0.02 |

TABLE 2 variation of the operating parameters and
silicon deposition on the nozzle with a reactor
pressure of 2 bar absolute

| Example | Operating temperature (° C.) | Nozzle wall temperature (° C.) | Reaction gas concentration locally on the nozzle (mol. %) | Nozzle deposition (μm/h) |
|---|---|---|---|---|
| 1 (C) | 900 | 910 | 0.1 | 0.9 |
| 2 | 900 | 910 | 5 | 0.01 |
| 3 (C) | 900 | 800 | 0.1 | 2.1 |
| 4 (C) | 900 | 800 | 5 | 1.0 |
| 5 (C) | 1000 | 1010 | 0.1 | 0.8 |
| 6 | 1000 | 1010 | 5 | 0.01 |
| 7 (C) | 1000 | 900 | 0 | 2.3 |
| 8 (C) | 1000 | 900 | 5 | 1.0 |
| 9 | 950 | 950 | 2 | 0.01 |

TABLE 3 variation of the operating parameters and
silicon deposition on the installed components with a
reactor pressure of 1 bar absolute

| Example | Operating temperature (° C.) | Temperature of components (° C.) | Reaction gas concentration locally on components (mol. %) | Deposition on components (μm/h) |
|---|---|---|---|---|
| 10 | 700 | 700 | 5 | 0.05 |
| 11 | 700 | 700 | 2 | 0.02 |
| 12 (C) | 700 | 700 | 0.1 | 0.8 |
| 13 (C) | 1200 | 1200 | 0.1 | 1.0 |
| 14 | 1200 | 1200 | 2 | 0.01 |
| 15 | 1200 | 1200 | 5 | 0.04 |
| 16 | 950 | 950 | 2 | 0.01 |

Examples 3, 4, 7 and 8 not according to the invention (comparative examples) showed that the local deposition of silicon increases with a reactor wall temperature which is lower than the operating temperature. Examples 1, 3, 5 and 7 not according to the invention furthermore show that the wall deposition surprisingly increases with reaction gas concentrations below 0.5%. The same is true of the nozzle wall deposit.

EXAMPLES 10 TO 16

The following components were installed in the reactor according to Example 1:

EXAMPLES 10, 11 AND 12

Installation of additional nozzles, represented as (24) in FIG. 5. A throughput of 10 m³ (stp) per nozzle of a gas composition containing from 99.9 to 95 mol. % of hydrogen and from 0.1 to 5 mol. % of trichlorosilane was delivered through the additional nozzles, which had a cross-sectional diameter of 3 mm.

EXAMPLES 13, 14 AND 15

Installation of annular gaps through which gas flows, as represented by (20) in FIG. 2 and (23) in FIG. 5. A 2 m/s flow rate of a gas composition containing from 99.9 to 95 mol. % of hydrogen and from 0.1 to 5 mol. % of trichlorosilane was set up through the annular gaps, which had a cross-sectional diameter of 2 mm.

EXAMPLE 16

Installation of annular gaps through which gas flows, as represented by (20) in FIG. 2 and (23) in FIG. 5. A 2 m/s flow rate of a gas composition containing 98 mol. % of hydrogen and 2 mol. % of trichlorosilane was set up through the annular gaps, which had a cross-sectional diameter of 2 mm. The operating temperature of the fluidized bed and the temperature of the installed components was adjusted to 950° C.

Similarly as in Example 1, with conditions otherwise remaining the same, the parameters operating temperature, temperature of the installed components and the reaction gas concentrations on the components were varied. Tab. 3 lists the varied conditions and the maximum deposition of silicon on the components. Examples 12 and 13 not according to the invention demonstrate that the wall deposition surprisingly increases with reaction gas concentrations below 0.5%.

The invention claimed is:

1. A method for the production of granulated polycrystalline silicon comprising depositing a reaction gas containing a gaseous silicon compound as silicon metal on silicon particles in a reaction zone of a fluidized bed reactor with a hot surface at a reaction temperature of from 600 to 1100° C., the silicon particles fluidized by means of a fluidizing gas to form a fluidized bed, and removing silicon particles with deposited silicon from the reactor together with unreacted reaction gas and fluidizing gas, wherein a gas composition containing from 99.5 to 95 mol. % of hydrogen and from 0.5 to 5 mol. % of the gaseous silicon compound is present on the surface of the reactor, the surface of the reactor is at a temperature of from 700 to 1400° C. which is at the temperature of the silicon particles or is higher than the temperature of the silicon particles in the reaction zone, the reactor containing 15-60 mol % gaseous silicon compound and 40-85 mol % hydrogen based on the total amounts of gaseous silicon compound gas and hydrogen gas in the reactor, and a reactor space inward from the surface of the reactor and within the reaction zone containing 20 mol % to 80 mol % gaseous silicon compound.

2. The method of claim 1, which is carried out continuously.

3. The method of claim 1, wherein a gas composition containing from 97 to 99 mol. % of hydrogen and from 1 to 3 mol. % of the gaseous silicon compound is present on the surface of the reactor.

4. The method of claim 1, wherein the temperature on the surface of the reactor is from 800 to 1100° C.

5. The method of claim 3, wherein the temperature on the surface of the reactor is from 800 to 1100° C.

6. The method of claim 1, wherein the fluidizing gas is hydrogen.

7. The method of claim 1, wherein the reaction gas contains a gaseous silicon compound.

8. The method of claim 1, wherein the reaction gas contains a monosilane or a chlorosilane compound.

9. The process of claim 1, wherein the reaction gas comprises trichlorosilane.

10. A fluidized bed reactor for carrying out the method of claim 1, comprising:
   a) a pressure-resistant casing,
   b) an inner reactor tube made of a material which has a high transmission for thermal radiation,
   c) an inlet for silicon particles,
   d) an inlet device for supplying a reaction gas which contains a gaseous or vapor-form silicon compound,
   e) a gas distributor for supplying a fluidizing gas, f) an outlet for unreacted reaction gas, fluidizing gas as well as gaseous or vapor-form products of the reaction, which accumulate above a fluidized bed surface, g) an outlet for the product, h) a heating device, and i) a power supply for the heating device, wherein additional nozzles are provided in the region of the reactor surfaces to be protected, the nozzles in fluid communication with the interior of the reactor, and a supply of a gas composition containing from 99.5 to 95 mol. % of hydrogen and from 0.5 to 5 mol. % of the gaseous silicon compound in fluid communication with said additional nozzles by means of which said gas composition is introduced into the reactor.

11. The method of claim 1, wherein the concentration of gaseous silicon compound within the reaction space is from 30 to 50 mol % based on the total amount of gas within the reactor space.

12. The method of claim 1, wherein the gaseous silicon compounds comprise 20 to 50 mol percent of the total gas contained in the reactor.

13. The method of claim 1, wherein hydrogen comprises 50 to 80 mol percent of the total gas contained in the reactor.

14. The method of claim 1, wherein the concentration of gaseous silicon compound within the reaction space is from 30 to 50 mol % based on the total amount of gas in the reaction space, and wherein of the total amount of gas contained in the reactor, gaseous silicon compounds comprises 20 to 50 mol percent of the total amount and hydrogen comprises 50 to 80 mol percent of the total amount.

15. The method of claim 14, wherein the gas composition present on the surface of the reactor comprises 97 to 99 mol percent hydrogen and 1 to 3 mol percent gaseous silicon compound.

16. The A fluidized bed reactor for carrying out the method of claim 1, comprising:

a) a pressure-resistant casing, b) an inner reactor tube made of a material which has a high transmission for thermal radiation, c) an inlet for silicon particles, d) an inlet device for supplying a reaction gas which contains a gaseous or vapor-form silicon compound, e) a gas distributor for supplying a fluidizing gas, f) an outlet for unreacted reaction gas, fluidizing gas as well as gaseous or vapor-form products of the reaction, which accumulate above a fluidized bed surface, g) an outlet for the product, h) a heating device, and i) a power supply for the heating device, wherein an additional gas inlet in the form of a ring shaped opening proximate the reactor wall is provided in the region of the reactor surfaces to be protected, the additional gas inlet in fluid communication with the interior of the reactor, and a supply of a gas composition containing from 99.5 to 95 mol. % of hydrogen and from 0.5 to 5 mol. % of the gaseous silicon compound in communication with said additional gas inlet by means of which said gas composition is introduced into the reactor.

* * * * *

UNITED STATES PATENT AND TRADEMARK OFFICE
CERTIFICATE OF CORRECTION

PATENT NO. : 7,922,990 B2  
APPLICATION NO. : 12/065790  
DATED : April 12, 2011  
INVENTOR(S) : Harald Hertlein et al.

Page 1 of 1

It is certified that error appears in the above-identified patent and that said Letters Patent is hereby corrected as shown below:

Column 10, Line 5, Claim 16

After "The" delete "A"

Signed and Sealed this
Sixteenth Day of August, 2011

David J. Kappos
*Director of the United States Patent and Trademark Office*